United States Patent [19]
Chika

[11] 3,968,994
[45] July 13, 1976

[54] AUXILLIARY BODY RESTRAINING DEVICE

[76] Inventor: John J. Chika, 1350 Orchard Ridge Road, Bloomfield Hills, Mich. 48013

[22] Filed: Oct. 24, 1972

[21] Appl. No.: 300,314

[52] U.S. Cl. .............................................. 297/390
[51] Int. Cl.² ........................................... A62B 35/00
[58] Field of Search ............ 297/384, 385, 389, 390; 24/170, 191, 173, 248 SL, 74, 164, 172; 128/75, DIG. 2; 2/2, 2.5, 44

[56] References Cited
UNITED STATES PATENTS

| | | | |
|---|---|---|---|
| 1,154,689 | 9/1915 | Bradley | 2/2.5 |
| 2,736,314 | 2/1956 | Hale | 128/DIG. 23 |
| 2,856,991 | 10/1958 | Princiotta | 297/389 |
| 2,876,829 | 3/1959 | Johnson | 297/389 X |
| 2,977,135 | 3/1961 | Graham | 2/2 X |
| 3,232,665 | 2/1966 | Von Wimmersperg | 297/385 |
| 3,262,716 | 7/1966 | Graham | 297/390 X |
| 3,278,230 | 10/1966 | Boyce et al. | 297/384 |
| 3,302,633 | 2/1967 | Vykukal | 244/122 B |
| 3,328,856 | 7/1967 | Jonas | 24/191 |
| 3,380,776 | 4/1968 | Dillender | 297/385 X |
| 3,480,325 | 11/1969 | Kramer | 24/170 X |
| 3,524,679 | 8/1970 | De Lavenne | 297/384 |
| 3,707,004 | 12/1972 | Kapitan | 2/2.5 |
| 3,722,951 | 3/1973 | Ezquerra | 280/150 B |
| 3,724,452 | 4/1973 | Green | 128/75 |

FOREIGN PATENTS OR APPLICATIONS 1,059,375   6/1959   Germany .......................... 24/248.6

*Primary Examiner*—James T. McCall

[57] ABSTRACT

An individual, auxiliary body restraining device for use in combination with any existing three-point lap belt-shoulder belt system which is available for seat occupant's use in any fast-moving transportation vehicle, the device easily attached, adjusted and removed to and from the upper section of any existing restraning system crossing his chest. The device consists of a thin but substantially rigid panel-like chest-shield element contoured to fit its user's chest dimensions, to absorb and distribute the impact force of the restraining system over greater area of his thorax, thus increasing his tolerance to the shock of the impact, while its upper transverse portion is configured into a unique half-collar to fit under his chin and partially around his neck to limit the unwanted movement of the occupant's head and to protect his neck and face from direct, violent and harmful contact with the naked restraining means during any violent deceleration of the vehicle.

45 Claims, 43 Drawing Figures

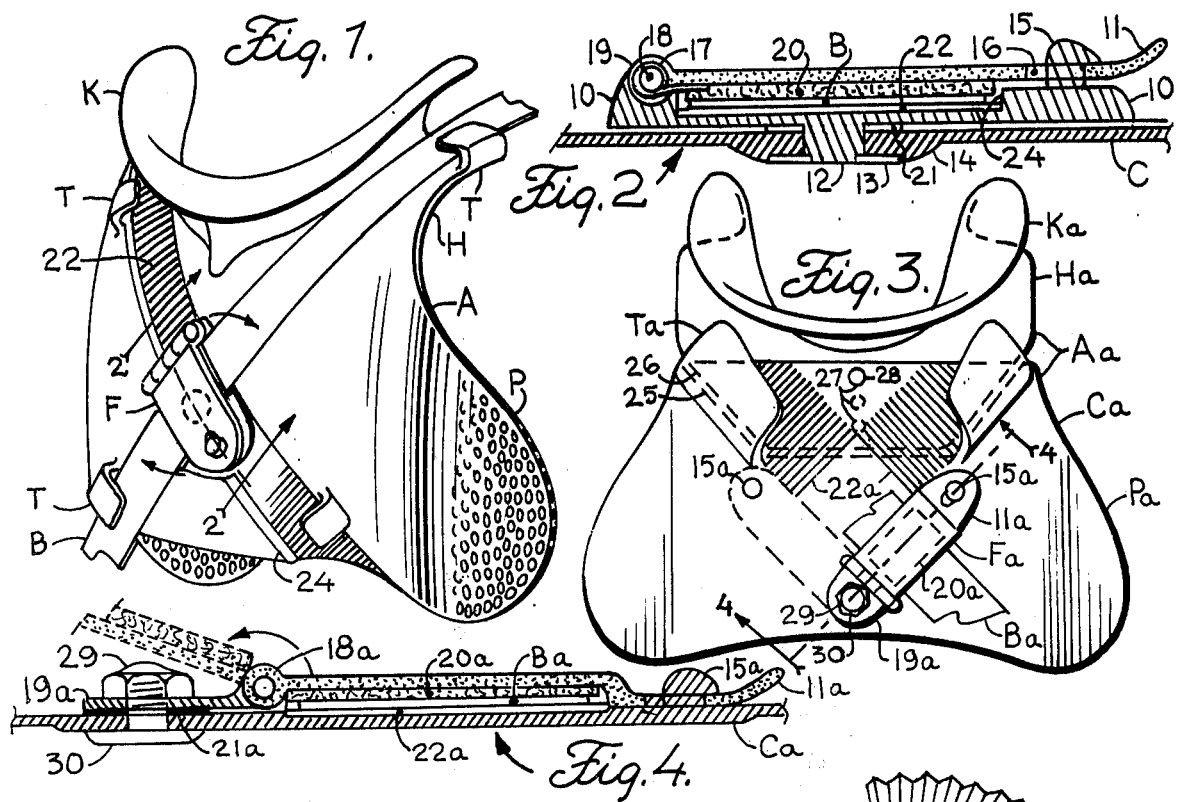
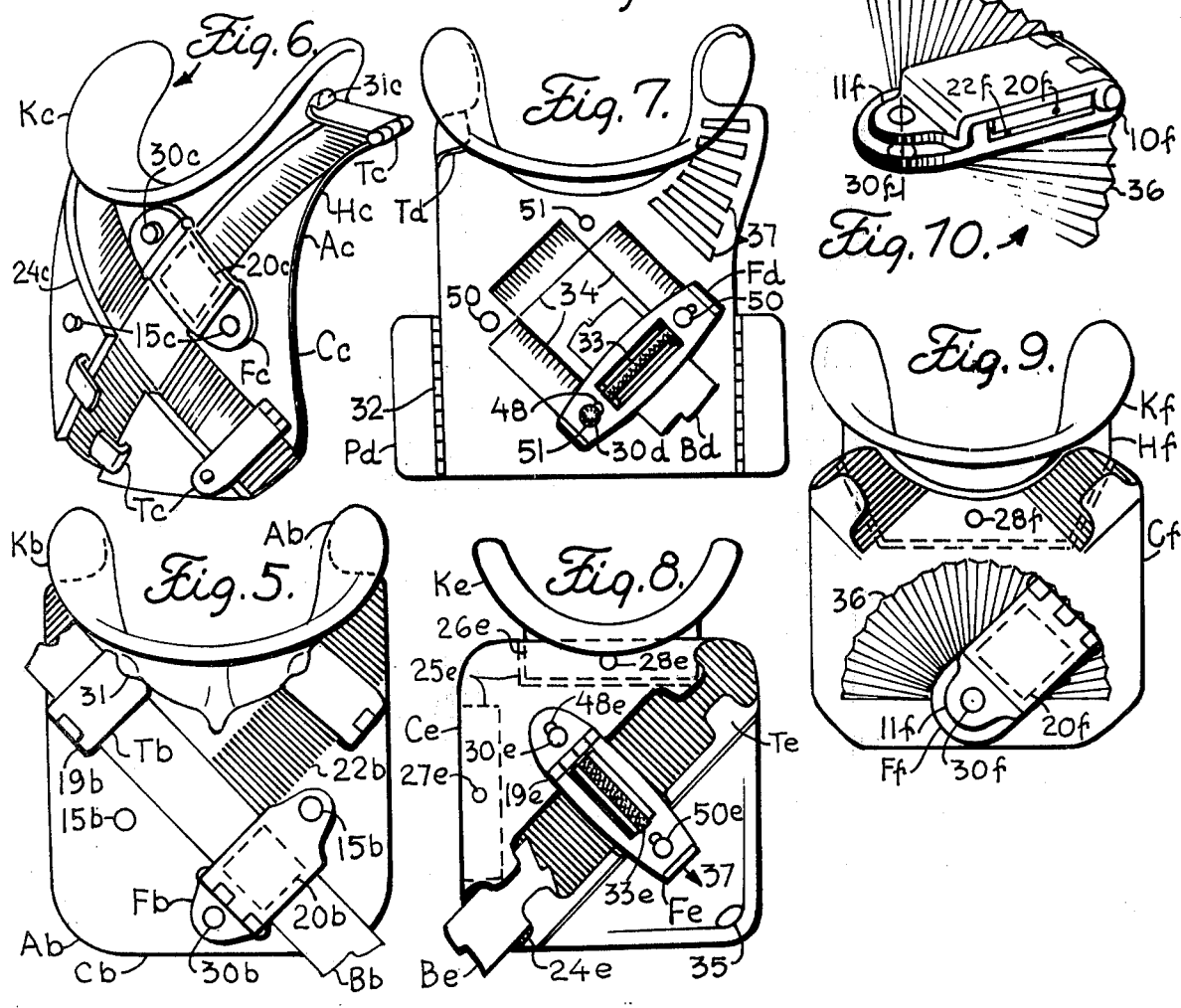

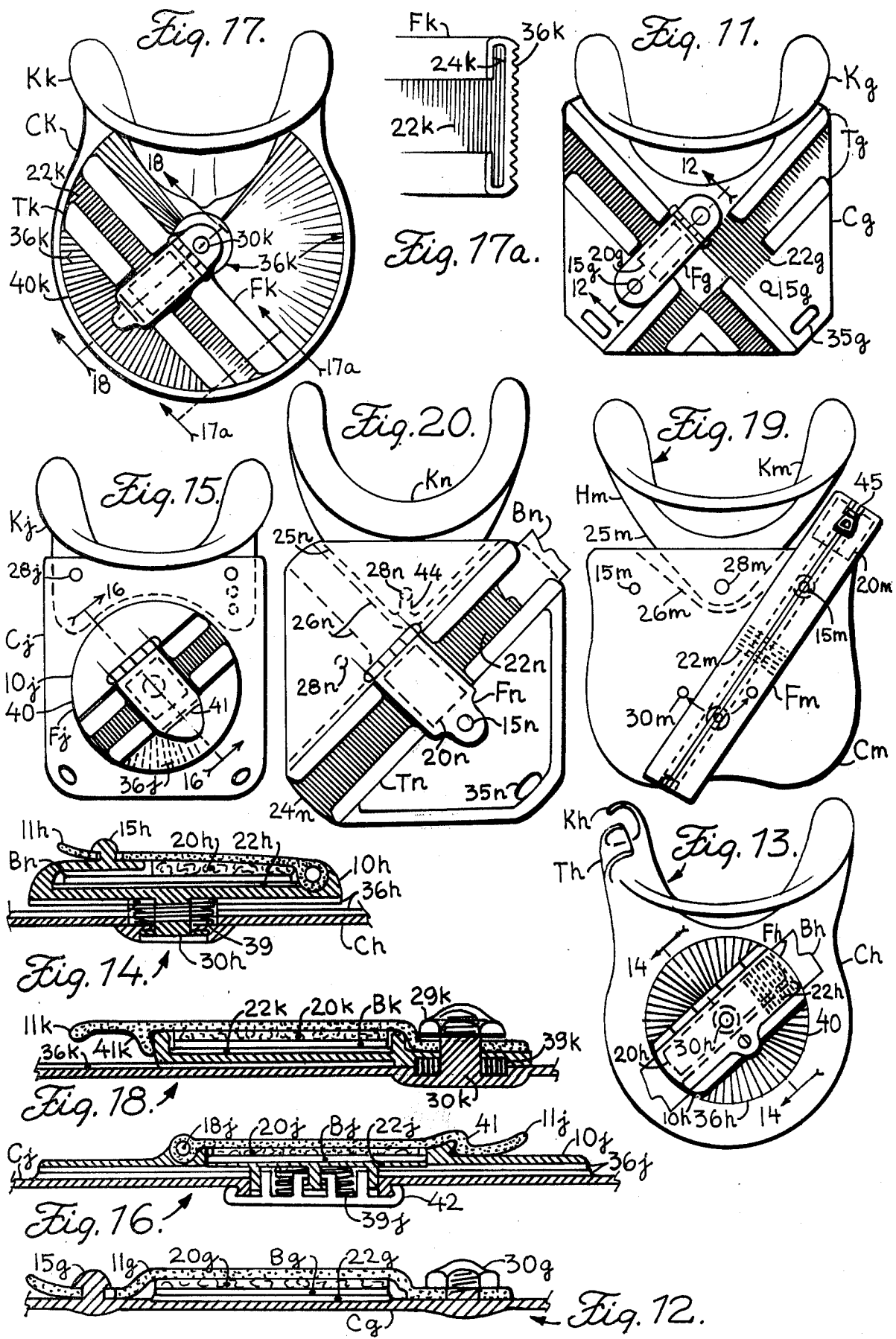

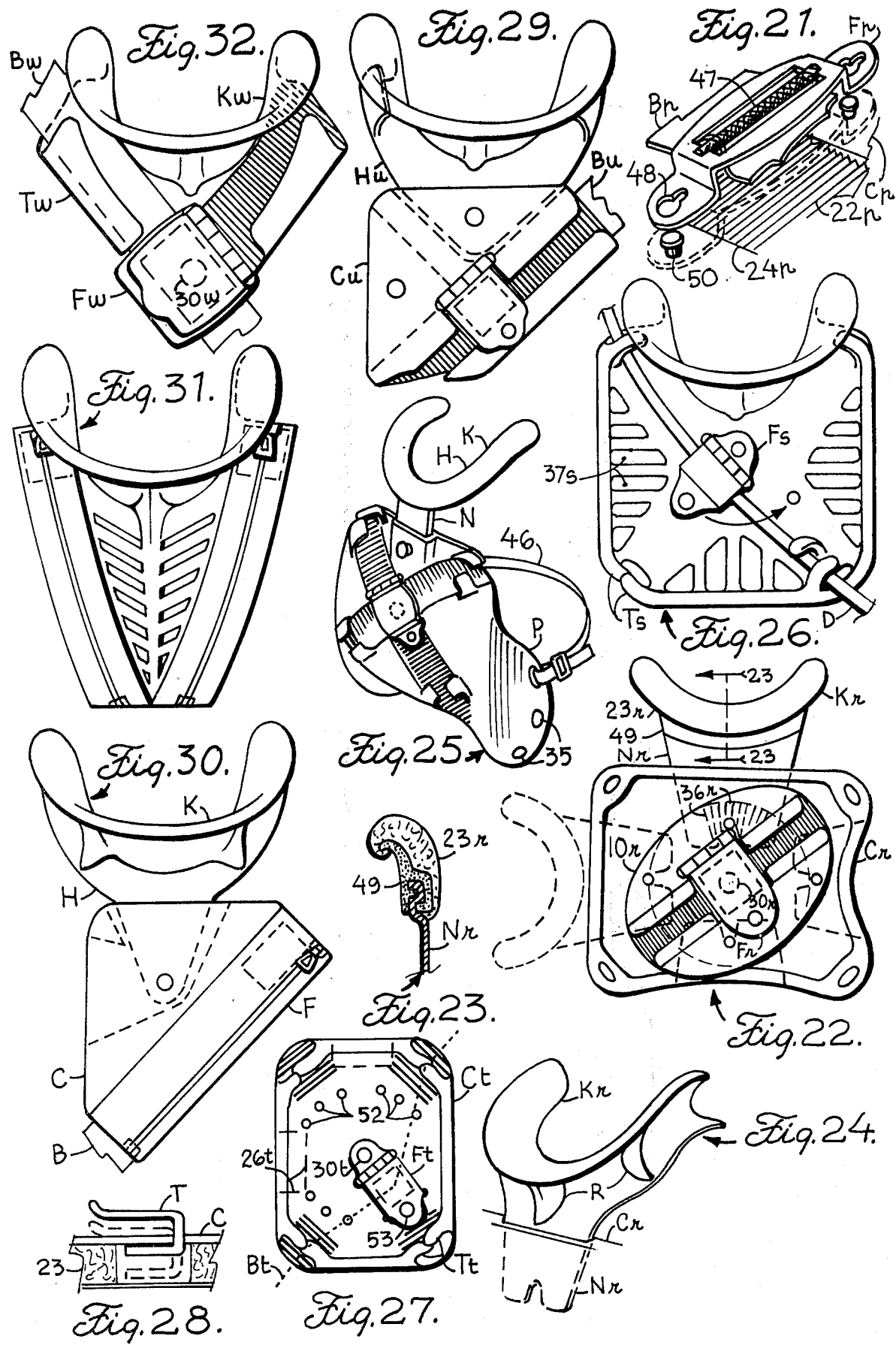

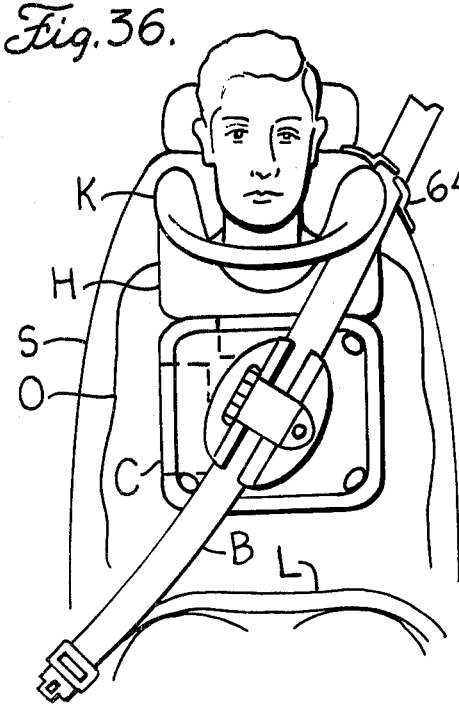
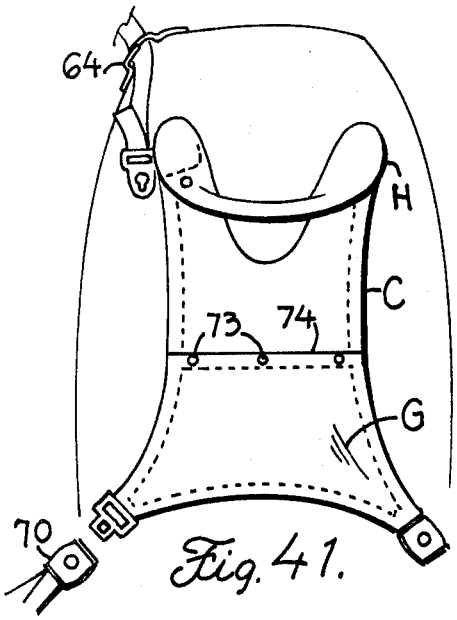
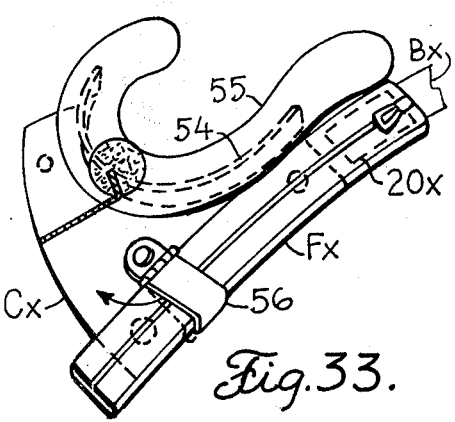
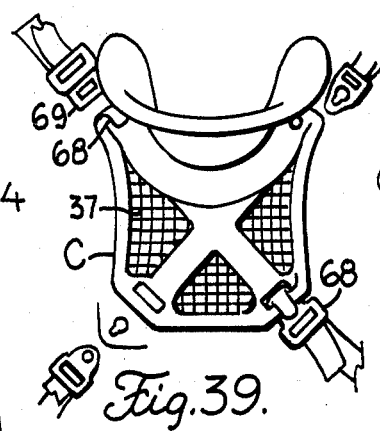
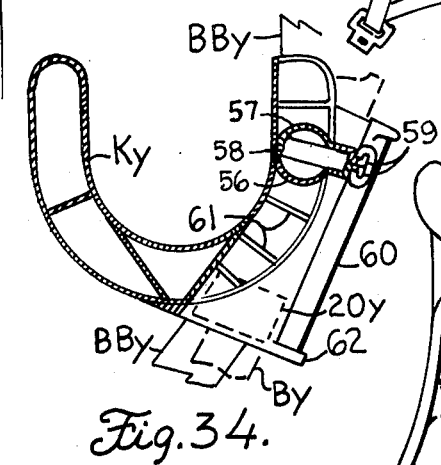
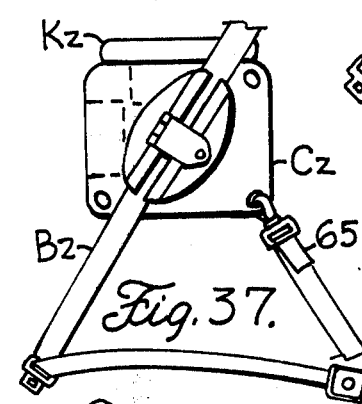
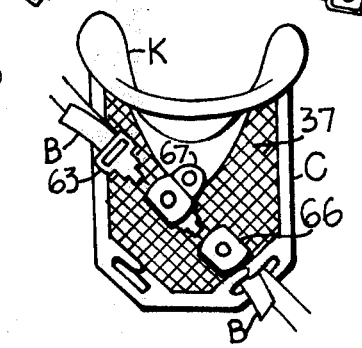
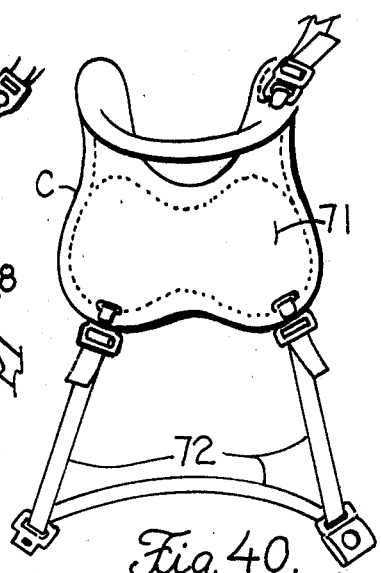
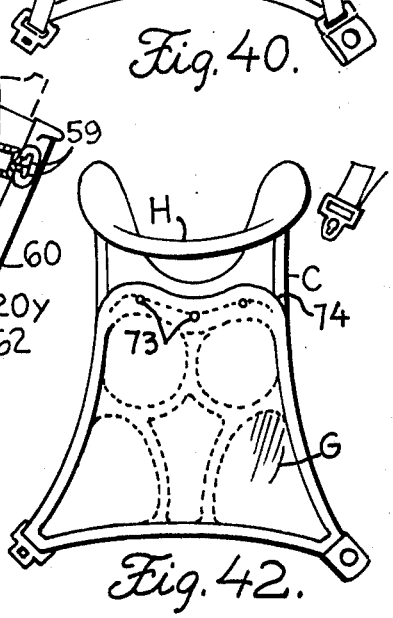
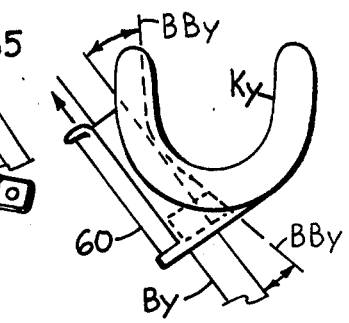

AUXILLIARY BODY RESTRAINING DEVICE

BACKGROUND OF THE INVENTION

This is a modification of my co-pending application Ser. No. 168,314, for Individual Restraining Device For A Vehicle User, further modified and adapted to be usable as an accessory to any existing shoulder-belt and or lap-belt restraining system to provide additional protection for its user in any collision.

The presently disclosed device could be very economical to produce and could last a lifetime; it could suit its user's physical dimensions, his purse and the degree of protection desired; it could be used by the driver or passengers, in any seat of any fast-moving vehicle, and even an occasional traveler could easily carry it when anticipating its need and just as easily store it away when not needed; it could be configured to be very personal or to be usable by anybody of similar body dimensions and in any private or public transportation means. It is so simple that there is no maintenance to it and it is easily and visually inspectable.

The paramount feature of this device is that people may actually see how much it would increase their travel comfort and safety if they would use it, and that it would solve most of the shortcomings of existing systems, thus increasing public acceptance of them.

There are innumerable variations to this invention as far as its appearance and even the relative emphasis on its two protective elements may be divided into three major sections:
1. Maximum protection for both head and chest;
2. Maximum protection for the head, minimum for the chest;
3. Maximum protection for the chest, minimum for the head; and unlimited combinations and variations of the above embodiments.

The device as disclosed may be produced in many ways, as may be dictated by cost, availability of materials and the degree of protection desired. It could be made in one piece, either stamped out of suitable metal and covered with cloth, or molded of transparent synthetic materials making it almost invisible when worn; it could be assembled of any combination of qualified materials and comprise padded areas, exchangeable covers, foldable or removable chest-shield panels, be transversely and vertically adjustable and come with various auxiliary straps for its use by children and invalids as well as for adapting the device to seats without any shoulder-belts, and any other sundry accessories and conveniences desired by its users.

DESCRIPTION OF THE PREFERRED EMBODIMENTS

The present invention as well as its various additional features and advantages may be best understood by reference to the following specifications which describe some of its illustrative embodiments. These specifications are to be taken with the accompanying drawings, of which:

FIGS. 1 and 2 illustrate one embodiment of the present invention configured as one unit with centrally mounted fastening means;

FIGS. 3 and 4 illustrate another embodiment of the device as a two-piece assembly with fastening strap secured to the Topgard below the shoulder-belt;

FIG. 5 is a front view of another embodiment of the device;

FIG. 6 is a front view of another modification showing the attaching means anchored above the shoulder-belt channels;

FIG. 7 is a front view of another model with novel fastening means and foldable side panels;

FIG. 8 is a front view of another novel configuration of this invention adapted for convertible use;

FIGS. 9 and 10 illustrate another type of attaching means;

FIGS. 11 and 12 illustrate a novel use of partially closed channels for retaining and guiding the shoulder belt;

FIGS. 13 and 14 present another type of connecting means;

FIGS. 15 and 16 show further modification of the above principle;

FIGS. 17, 17a and 18 illustrate still further modifications of the connecting means as shown in FIGS. 13 through 16;

FIG. 19 is a front view of the device with sleeve-type fastener;

FIG. 20 is a front view of another modification of the device;

FIG. 21 is a perspective detail view of a fastener which is attached to existing shoulder-belt means;

FIG. 22 is a front view of another convertible model of the present invention;

FIG. 23 is a cross sectional detail view of a typical collar;

FIG. 24 is a perspective view of another type of a collar;

FIG. 25 is a perspective view of the device as adapted for use by a child or an invalid person;

FIG. 26 is a front view of the device adapted for use of cables;

FIG. 27 is a front view of another chest-shield with novel means of fastening it to the shoulder-belt;

FIG. 28 shows a cross-sectional detail view of a belt guide;

FIGS. 29 and 30 present the minimum chest-shield adaptations;

FIG. 31 is a front view of the device showing its styling;

FIG. 32 is a front view of the minimum chest-shield means;

FIG. 33 is a perspective view of another head-guard means;

FIGS. 34 and 35 show the minimum head-guard modifications;

FIG. 36 is a front view showing general disposition of typical Topgard as used with maximum head-guard element;

FIG. 37 illustrates the use of auxiliary belt means and the chest-shield with the minimum head-guard;

FIG. 38 illustrates another modification of the Topgard for use with divided shoulder-belt means;

FIG. 39 shows how the divided shoulder-belt means may be easily connected to the corners of the device;

FIG. 40 illustrates another form of the device as may be preferred by some users with modified three-point restraining system;

FIG. 41 illustrates how the device may be combined with a stomach plastron means;

FIG. 42 illustrates one possible configuration of the device combined with specially configured stomach plastron.

Referring now to the drawings, FIG. 1 shows an overall perspective view of the general appearance of my new device A in one of its preferred embodiments, as it might appear when built for specific use by an individual of given dimensions and used with a shoulder-strap B crossing his left shoulder. The major components of the Topgard comprise the chest-shield element C, with its side panels P to partially embrace his rib-cage, and the head-guard element H with its side portions resting on the occupant's shoulders and the collar section K configured to fit under the chin and around the neck of its user.

To the middle of the chest-shield C is rotatably secured fastening buckle F, shown in more detail in FIG. 2, which is a cross-sectional view taken through its center, looking in the direction of arrows 2—2 in FIG. 1. The fastening buckle F consists of two major parts: the base housing 10, rotatably attached to the chest-shield C by stud 12, means 13 in reinforcement 14 of the chest-shield and spacer washer 21 and is adapted to accept any conventional belt B in its channels 24 which are provided with transverse serrations 22; and the belt fastening cover 11, hingedly attached to the base 10 by strap-hinge means 19 and pin 18, with optional spring means 17 and cover 11 being resilient enough to stretch over the stud 15 to lock the fastening buckle assembly to shoulder belt B and hold it slidably in any position by means of the resilient pad 20 secured to the inner side of the fastening cover 11.

The fastening buckle F is rotatable just enough to accept the shoulder belt B crossing either shoulder of the occupant, and may be made of metal or synthetic materials. When a person is seated in a vehicle seat and the shoulder-belt B is positioned over his chest from either side, he simply slides the device under it, opens the cover 11, places the belt B into the corresponding channel 24 and snaps the cover 11 over the stud 15; this will compress the resilient pad 20 against the belt B in channel 24 sufficiently to keep the device A in any selected position, but will allow easy vertical adjustment of it along the belt B when there is no forward pressure against it. The channels 24 with serrations 22 are incorporated into the face of the chest-shield C in both directions where the belt would normally cross it; thus, when the vehicle is subjected to any sudden deceleration, occupants' body is forced forwardly into the device which presses serrations 22 against the belt B in channel 24 and thus locks the device at that location on the belt until the forward pressure is relieved, when it will become easily slidable again.

The belt locating and controlling means such as tabs T, which may be spaced as needed and of many configurations, will prevent the device from rotating around the fastening buckle F in any side decelerations; they may be integral with the shield C or of the recessed type as shown in more detail in FIG. 28.

FIGS. 3 and 4 illustrate my invention as adapted to the two-piece interchangeable concept, whereby various sizes and configurations of the chest-shield Ca are easily usable with various sizes and configurations of the head-guard Ha, thus making this device adaptable for use by greater range of occupant sizes. The chest-shield Ca comprises in its upper section a double-wall pocket 25 into which the lower end 26 of the head-guard Ha is inserted and held in selected position by fastening means 28 through plurality of holes 27 in panel 26. Also, the head-guard Ha could be molded of transparent synthetic materials, making it hardly noticeable when worn, while the chest-shield Ca with its pocket 25 could be of aluminum suitably covered and padded where desired.

The belt fastening assembly Fa is rotatably secured to the chest-shield Ca below the center-line of the belt Ba, as is better explained in FIG. 4, wherein the belt fastener 11a is secured by means 18a to the strap-hinge 19a rotatably attached to the chestplate Ca by means of a bolt 30, nut 29 and washer 21a. Tabs Ta and serrations 22a in the upper portion of the shield assure positive engagement with the shoulder-belt whenever needed. The head-guard Ha is adjustable to make the assembly higher or lower by simply releasing the locking means 28, which may be of any available variety, sliding the head-guard up or down as desired and then locking it into the closest of the holes 27 in the head-guard.

FIG. 5 illustrates a very simple embodiment of my invention, without side panels P, and configured for a specific size torso and head; the belt fastener Fb is rotatably secured to the chest-shield Cb below the center line of the belt Bb and the tabs Tb are of the hinged type, kept in closed position by simple snap means 31, while the resilient means 20b keep the device in any desired location along the shoulder-belt Bd.

FIG. 6 illustrates similar modification of the device in which the fastening means Fc is mounted above the center-line of the belt Bc, and the serrations 22c, which in FIG. 5 are just on the surface of the shield, in FIG. 6 are located in deep channels 24c to insure proper positioning and more grip on the belt Bc when exposed to any impace conditions; tabs Tc may be of the recessed type as is explained in FIG. 28, or of the hinged type as in FIG. 5, lockable to collar Kc by means 31c.

FIG. 7 is a front view of another embodiment of the device showing side panels Pd attached to chest-shield Cd by specially modified hinge means 32, which allow panels to fold against the back side of the shield when not used, but open up to no more than 100° from the transverse plane of the shield, thus forming effective side restraint for the thorax of its user in any side decelerations of the vehicle; the panels Pd could be easily and completely removable and exchangeable by using removable hinge pins in hinge 32. The shield has on its front face four diagonally disposed depressions 34 configured to operatively engage with the specially modified fastening means Fd configured on the principle of a knurled transverse strap bar 33 slidably coacting with the fastener Fd adapted to be operatively, interchangeably positionable over any of the four depressions 34; the two threaded holes 51 are located on vertical center-line of the shield and studs 15 have resilient grommets; thus the shoulder-belt is simply positioned across whichever of depressions 34 lines up with it, the fastener Fd is rotated around its bolt 30d and pressed over the opposite stud 50, locking it by engaging its key-hole aperture 48 with the stud. The vent holes as 37 are configured to function as modified serrations 22 and could be on one side of the shield only when practical.

FIG. 8 is a front view of another modification of my invention with several novel features: it may be used with or without the head-guard Ke and the chest-shield Ce is configured for use with either left or right side shoulder-belt by simply rotating it 90°; the collar Ke is simply inserted into the pocket 26e facing upward. The fastener Fe is similar to the one in FIG. 7, except that it is hinged and slidably secured at 30e and there is only one depression in the serrated channel 24e to operatively cooperate with roller 33e; to attach it, the fastener Fe is opened, the belt is positioned into the channel, the fastener is closed and pushed in the direction of the arrow 37 thus allowing the shield to move up or down along the belt but locking it when under forward pressure against it; the tabs Te are in form of flanges partially closing the channel 24e and holes as 35 may be provided where needed for attaching any auxiliary straps and accessories when desired.

FIGS. 9 and 10 illustrate another variation of my invention, in which the fastening means Ff comprise modified buckle base 10f which has its bottom surface provided with annularly disposed serrations 36 configured for operative engagement with similarily disposed serrations formed in the outward face of the chest-shield Cf; thus, although the buckle assembly Ff will freely rotate about its spring-loaded means of attachment 30f when there is no pressure against the device, it will lock instantly and automatically in whatever position of angular inclination it may be at the moment of any severe impact and stay locked for the duration of such pressure being exerted against it; the friction pad 20f will hold the device in any slidably adjustable position on the belt Bf and the serrations 22f may be disposed over as much area as desired.

Another design modification of my device is shown in FIGS. 11 and 12 wherein the retaining tabs Tg are provided along both edges the belt Bg and the fastening strap Fg is snapped over either of of the studs 15g to compress the resilient pad 20g against the belt and slidably secure the device to it.

FIGS. 13 and 14 illustrate further modifications of the fastening principle as explained in FIGS. 9 and 10, wherein the spesially modified fastening buckle Fh is centrally and rotatably attached to the chest-shield Ch at 30h located at the center of the circular panel 40 of annularly configured serrations 36h and configured to operatively engage with similarly serrated bottom side of the fastener Fh. Thus, once the cover 11h is opened and the belt Bh is inserted and locked within the fastener Fh, its user is free to lean left or right, but under any forward pressure against the Topgard the serrations 36 will interlock and prevent the person from tilting either way. The compression spring means 39 keep the serrations 36h normally disengaged as shown in FIG. 14.

FIGS. 15 and 16 illustrate still further embodiment of the fastening principle explained in FIGS. 9 and 10, wherein the circular base housing 10j with its annular serrations on its bottom surface is as large as the field of similarily configured serrations in the circle 40j on the face of the chest-shield Cj, thus increasing the contact area of interlocking surfaces so much that the tabs T may be omitted and the whole assembly could be easily molded from transparent synthetic materials except for the hinge pin 18j, the compression spring 39j and the resilient pad 20j.

FIGS. 17, 17a and 18 illustrate one more embodiment of the system explained in FIGS. 9 and 10, comprising annularly serrated circular panel 36k over which glides elongated fastening means Fk rotatably attached at 30k to the chest-shield Ck; the advantage of this embodiment is that the belt Bk is always secured within the channel 24k while allowing greater freedom of movement under normal riding conditions but locking more positively under any pressure against the Topgard.

FIG. 19 is a front view of another embodiment of this invention wherein the removable, exchangeable head-guard Hm offers limited tilting from left to right side within the pocket 26m of the chest-shield Cm and the fastening means Fm is configured in shape of a sleeve to accept the belt Bm within it and provided with closure means as separable fastener 45; the sleeve is rotatably secured to the chest-shield Cm at 30m on its lower end while its upper end is attached by means 15m at either left or right upper corner of it. The sleeve Fm has on its inner bottom surface serrations 22m, and its upper end comprises resilient pad 20m; thus, when the shoulder-belt Bm is inserted into the opened sleeve, the separable fastener 45 may be closed up to the resilient pad 20m and still allow sliding adjustment of it along the belt, but once the separable fastener is fully closed, the device is locked at that point. The plurality of holes 30m permit the device to be adjusted to various dimensions of its users.

FIG. 20 illustrates another convertible embodiment of this invention somewhat similar to FIG. 8, in which the chest-shield Cn may be also rotated to accommodate left or right side shoulder-belt Bn but the head-guard Hn has a notch on its bottom as 44, which locks over the pin means 28n in pockets 26n for easier and faster exchange of various head-guards Kn; the fastener strap Fn is hinged on one side of the partially flanged channel 24n, opens it and snaps onto means as 15n on the opposite side of it.

FIG. 21 is a perspective view of another fastening means as Fp comprising a knurled cylindrical clincher bar 47 which is permanently but slidably secured to the existing houlder belt Bp; the chest-shiled Cp has pins 50 on both sides of its serrated channel 24p for quick engagement with key-holes 48 in the fastening assembly Fp, so the user simply locates the fastener Fp over the shield and pins 50 and locks it to them. The chest-shield could have four pins located as 50 and 51 in FIG. 7 or two pins located as 50e and 30e in FIG. 8.

FIGS. 22, 23 and 24 illustrate another embodiment of my convertible restraining device, comprising fastening means similar to those explained in FIGS. 13 through 18; the chest-plate Cr has at its center a circular field of annularly configured serrations 36r; over it, rotatably secured at 30r is an eliptically contoured fastener base 10r which has on its bottom surface a circular field of annular serrations which are operably engageable with tose in the shield Cr; the transverse axis of te elipse is as long as practical and it comprises serrated channel 24r with flange tabs Tr to guild the belt Br. Because the chest-shield Cr is of rectangular contour and has four pockets for inserting the head-guard Kr into it, broader range of torsoes may be accomodated by simply rotating the chest-shield as desired and inserting any selected head-guard Kr into the upward facing pocket. Even the head-guard may be of the very minimum configuration as shown in FIGS. 8 or 35, and of very simple construction as shown in FIG. 23, in which the connecting stem Nr may be of stamped aluminum and the plastic, semi-rigid section 49 could be covered with molded resilient portion 23r; or it could be molded of semi-rigid transparent plastic as shown in FIG. 24, which is a perspective view of a typical configuration with reinforcing ribbs R to provide proper rigidity for it.

FIG. 25 is a perspective view of a device for use by children and invalids; it may be of any suitable size and configuration as revealed in this disclosure if properly adapted and provided with means of attachment as holes 35 for securing to it any needed auxiliary straps as 46 to reach around child's midsection; the head-guard may be of semi-rigid tubular constructiton and the connecting stem N is adjustable in height to accomodate chilren of various ages.

FIG. 26 illustrates how this device could be adapted for use with any other type of shoulder restrains such as nylon cables D and vinyl covered ropes by simply modifying the fastening means Fs to accept and lock the device at any desired position to the type of cable used and the simple, double taps Ts configured on the principle of chocks as shown will accept almost any type of cable; the shield may have perforations or openings as 37 to provide ventilation.

FIG. 27 illustrates another convertible modification of the chest-plate Ct, wherein its rectangular shape accommodates two sizes of torsoes for either left or right shoulder-belt, and its contour could vary as suggested if FIG. 22; the hinged fastener Ft is rotatably secured to the center of the shield Ct and its other end is provided with a quick-release snap type means as 53 which is securable into any of holes 52 spaced equidistantly from center 30t; the shoulder restraint means could be either a belt or a cable and instead of crossing the chest-shield Ct in a straight line it is forced to bend as indicated by the line Bt, thus positively locking itself inside the fastener ft under any severe tension.

FIG. 28 is a detail cross-sectional view showing a simple way to recess tabs T against the outer surface of the chest-shield C by simply pushing them into cavities provided for that purpose in the padded lining 2 when they are not needed.

FIG. 29 illustrates further modification of this invention in which the chest-shield element Cu is minimized in its size and is configured just big enough to allow the head-guard Hu to be secured and supported by the shoulder-belt Bu; otherwise this configuration is very similar to one explained in FIG. 20.

FIG. 30 illustrates another configuration of the device as is described in FIG. 29, except the sleeve type of fastening means as F is used to attach the device to any shoulder-belt B, as described in FIG. 19, and also the sleeve is permanently secured to one side of the triangular chest-shield C.

FIG. 31 illustrates just one of innumerable configurations of this invention that are possible as far as style and appearance appeal are concerned.

FIG. 32 illustrates another modification of my invention, wherein the chest-shield element is deemphasized even further by being configured just big enough to provide sufficient base support for the head-guard Kw and to accommodate the shoulder-belt Bw from either left or right side with belt retaining and locating means as flanges Tw and to rotatably secure the buckle Fw at 30w.

FIG. 33 illustrates still further modification of the Topgard concept comprising the very minimum embodiments of both the head-guard and the chest-shield elements wherein the chest-shield Cx is configured just big enough to provide sufficiently rigid support for its flange as 54 over which is securely but replaceably fitted collar as 55 made of preferably made of molded styrofoam or any other light, pressure yealding and impact absorbing material properly finished to provide smooth, pleasant to touch surface; the flexible sleeve Fx could be molded of vinyl material and its function and securement to the shield Cx is explained in FIG. 19, but for additional security the rotatable hinged strap as 56 could be added to augment means as 30m and 15m in FIG. 19.

FIGS. 34 and 35 illustrate another embodiment of my invention offering very little chest protection; it is molded in two halves of suitable, preferably transparent plastic material and joined together to form very light but strong cylindrical collar Ky in the area where it extends from the line of shoulder-belt By as is indicated by cross-hatched lines, but open from there on, creating a cavity to accept the belt By; as is shown in the cross-sectional detail in FIG. 34, the two halves 56 and 57 are joined at 58 and are so configured that on the outboard straight line they form the channel sections 59 which allow the belt By to slip between them into the cavity when open, but are locked together by a split tubular sleeve 60, which is configured in form of a C and slidable over the two channel flange sections 59 from their top to the stop means as 62, thus locking the belt By in the cavity which has its flat inner surfaces which would come into contact with the belt serrated and at its lower portion comprises resilient pads 20y; thus when the tubular sleeve 60 is pulled just short of pads 20y, the device is slidable along the belt By, but when it is pulled down to the stop 61, it is locked to the belt. Because of its simmetrical cross sectional configuration, this embodiment is usable with left or right side shoulder-belts by simply turning it over; it is so unobtrusive in appearance that it will be hardly noticed and it should overcome all the fears of neck and head injuries that people are associating with the present day shoulder-belts. Lines BBy indicate how the shoulder belt By would be kept from contacting the neck of the device user in any lateral impact.

FIG. 36 is a front view of a typical Topgard as it might appear when worn by an occupant O in a seat S with the lap-belt L over his lap and a shoulder-belt B crossing his left shoulder; the chest shield C is of the type described in FIG. 22 while the head-guard K is of the maximum protective size, and because the seat is high enough, the shoulder-belt B may be slidably secured by a shock-type holding means as 64 to help position and control it if it is anchored at a roof-rail or any other distant point.

FIG. 37 illustrates how any of the separate chest-shields as Cz may be combined with only the minimum type collar as Kz insertable into the chest-shield pocket to prevent neck injury from the top of the shield C under severe deceleration conditions. Also, any type of auxiliary stray means as 65 may be secured to the lower corner of the shield and adjustably attached to the nearest lap-belt anchor means for added restraint and protection.

FIGS. 38 and 39 illustrate further modifications of device, wherein the existing shoulder-belt is adapted by cutting it at appropriate place and attaching to the cut ends matching connecting means which will be attachable either to each other or to the device, thus making them convertible for either use.

As shown in FIG. 38, the shouder-belt B is cut and to one end is attached tong end 63 and to the other a fast-acting buckle 66, so they may be locked together and still used as a shoulder-belt; however, when used with the device, they would be connected to the specially configured double acting buckle means 67 rotatably attached to the chest-shield C which could be configured of a rigid frame with panels of netting as 37.

Another modification is shown in FIG. 39, wherein the two ends of the cut shoulder-belt B would be provided with matching means of snap hooks 68 and 69, or with the common key-hole-and-pin means shown on the opposite corners, which also could be used with each other or for adjustable connections to the device. This configuration would leave the face of the chest-shield clear of any hardware and could be of semi-rigid construction and partially perforated as indicated by 37 and attached to the head-guard H. In seats with only lap-belts available, one or both lower corners of the chest-shield C would be adjustably connected to the lap-belt or its anchor means, while to the top buckle as 69 would be adjustably attached an auxiliary strap for securing to the nearest suitable and secure vehicle component.

FIG. 40 illustrates another specially configured modification of my device, wherein the whole device is designed to allay the fears of some type of users by having only the essential framework of the shield C made from semi-rigid materials while the rest would comprise panels of pressure yieldable, slow recovery, pliable materials 71; the lower portion of the shoulder-belt B and even the lap-belt could be replaced by one three-way belt 72, slidably coacting with existing lap-belt anchor means and adjustably secured to bottom corners of the shield.

FIGS. 41 and 42 disclose still further development of this device, wherein the head-guard H and the chest-guard C are supplemented by the stomach apron G. As shown in FIG. 41, the chest-shield C is on its bottom edge connected by such means as channel 74 and fasteners 73 to plyable, plastron-like panel G, reinforced where needed and made of any suitable material, including ventilation vents and other desirable additions and comprising on its reinforced bottom corners suitable means of attachment of it to the existing anchor means for lap-belts or belt fittings 70; the top shoulder corners of the head-guard H are provided with proper means to connect them to the existing shoulder-belt and the guiding bracket 64 may be added for further snubbing effect at time of a collision. While the configuration in FIG. 41 is for general use, the modification shown in FIG. 42 is designed for women; the rigid chest-shield C limited to above the breast line and the rest of the plastron G configured of soft, pliable material reinforced as needed and shaped, fashioned and embellished with any sundry ornamentations and accessories as desired by its user and dictated by costs and fashions.

It is obvious from the foregoing disclosure that this invention could not be divided into two separate units, as a chest-shield or a head-guard because it was conceived to offer protection to the whole upper torso, and the allowed emphasis on either the head or the chest is introduced only to better expose the full range and flexibility of this concept, and also since even the minimum head-guard as Kz in FIG. 37 would be sufficient to prevent whiplash of its user's head, and since even the sleeve 60 in FIG. 35 would offer greater chest protection, the two elements are inseparable.

Also the disclosed embodiments could be divided into two basic types: those depending for their support and location solely on the shoulder-belt crossing seat occupant's chest and others being supported and positioned by user's shoulders.

It will be recognized that various other means of attachment, control, fastening, assembly and operation of the basic restraining device could be readily incorporated into various preferred embodiments disclosed, and that the invention is susceptible to further modification, variation and change without departing from the proper scope of fair meaning of the subjoined claims, and that the above descriptions are to be construed only as illustrative and not limiting this invention.

I claim:

1. An auxiliary body restraining device to provide additional protection and restraint for the head and the upper torso of an occupant of a transportation vehicle seat which is equipped with any type of a lap-belt and shoulder-belt body restraining system, the device comprising in combination:

an auxiliary protective guard for the seat occupant's thorax, head and neck, said guard being easily attachable and detachable to and from the upper section of the existing restraining system crossing the front of the seat occupant's chest;

said guard comprising a relatively thin, rigid, panel-like chest-shield portion which is adjustably positionable substantially transversely and vertically in front of and immediately adjacent to the seat occupant's chest by inserting it underneath and securing it to said upper section of said restraining system crossing his chest, so that the chest-shield will absorb and distribute the impact force of said restraining system over greater area of said occupant's thorax whenever he is being restrained by it;

the upper portion of said chest-shield configured to fit under said occupant's chin and partially around his neck to form a unique head-guard element to limit unwanted movement of the occupant's head and to protect the occupant's head from severe whiplash and other injuries caused by said upper section of said system coming into direct and violent contact with said occupant's head, neck and face while he is being restrained by said upper portion of said chest-shield during any severe deceleration of said vehicle.

2. A device as claimed in claim 1, wherein said head-guard element is extended to reach substantially upwardly and rearwardly over said occupant's shoulders to provide additional side protection for his head in any severe side deceleration of said vehicle.

3. A device as claimed in claim 1, wherein said chest-shield element is extended downwardly and transversely partially around seat occupant's thorax region to provide additional restraint for his seated upper torso in any severe side deceleration of said vehicle.

4. A device as claimed in claim 1, wherein the proportional configuration of said restraining device conforms to the proportional configuration of said seat occupant's torso, head and neck.

5. A device as claimed in claim 1, wherein said protective elements comprise transparent polycarbonate materials of such characteristics and dimensions whereby they will provide sufficient flexibility, resiliency and cushioning in areas which will come into direct contact with the vulnerable portions of its user's body, and the required strength and rigidity in those areas which will be required to position and support said head-guard element at all times and to distribute the severe inertia load from the restraining belt means into broader and stronger upper chest portion of occupant's torso during any severe deceleration and collision of the vehicle.

6. A device as claimed in claim 1, wherein the upper portion of said head-guard element is produced from materials of such characteristics and dimensions whereby they will provide areas of soft, pressure yieldable and resilient contact with easily vulnerable areas of user's head, while its lower portion which supports and connects said head-guard element to said chest-shield element is of sufficient rigidity and strength to protect the occupant's head from whiplash during any severe deceleration of said vehicle.

7. A device as claimed in claim 1, wherein portions of the device are padded, portions comprise means for easy securing of removable sanitary covers and provisions to accommodate carrying of personal accessories.

8. A device as claimed in claim 1, wherein said restraining device is configured in two separate, operatively coordinated parts: the head-guard and the chest-shield, including means to operatively combine them into one assembly and means to adjustably position the assembly over the chest of its user by operatively connecting it to the existing lap-belt and shoulder-belt means.

9. A device as claimed in claim 8, wherein the means of combining said head-guard and chest-guard into one assembly comprise pocket-like slot means configured in the upper front center portion of said chest-shield and having a double wall construction opened on its upper transverse edge to accept into it the lower front center section of the base portion of said head-guard.

10. A device as claimed in claim 8, wherein said head-guard and chest-shield elements are configured to accommodate various sizes and individual proportional characteristics of the head and the upper torso of its user, and are configured to be mutually, interchangeably and adjustably attachable and detachable to each other to form the type of a restraining device which will suit its user's physical proportions and needs.

11. A device as claimed in claim 8, wherein the lower base portion of said head-guard is sufficiently reinforced to provide needed support for the user's head at all times, and its lower front center portion configured to form a rigid plate-like means shaped and adapted to be easily insertable, adjustable and securable into an opening provided for it in the top transverse edge of said chest-shield element.

12. A device as claimed in claim 1, wherein said chest-shield element is configured of rigid and semi-rigid materials shaped to accommodate the physical configuration of user's upper chest and covering the desired portions of his upper torso; its outward surface being finished in a smooth and pleasant to touch manner, its inward surface padded where desired and finished in abrasion preventing manner.

13. A device as claimed in claim 1, wherein said chest-shield element is configured to span the width of its user's chest and comprises left and right side panels which are hingedly attached to its outboard edges in such manner whereby they will readily fold against the back side of said chest-shield for easy storage, but will open only partially, thus providing lateral restraint means for its user's upper torso in time of any severe side deceleration of said vehicle.

14. A device as claimed in claim 8, wherein said chest-shield element is configured in substantially rectangular contour, thus enabling one device to be used by plurality of people of varied chest sizes by simply rotating said shield 90° to either side, with at least two of the unequal sizes of said shield comprising means of attaching the suitable head-guard elements adjustably and interchangeably to them.

15. A device as claimed in claim 1, wherein said restraining elements comprise sufficient means of ventilation through their structures to accommodate its user's bodily comforts.

16. A device as claimed in claim 8, wherein said chest-shield is of the very minimum size and configuration providing only the means of support and attachment of the head-guard to it and means of slidably adjustable attachment of said chest-shield to the restraining shoulder-belt means.

17. A device as claimed in claim 8, wherein said chest-shield panel, in its front view, is configured in shape of a right angle triangle, with its hypotenuse side configured for slidably adjustable attachment to the existing shoulder-belt means and the other sides of it provided with means of adjustable, interchangeable acceptance and attachment of various head-guard means.

18. A device as claimed in claim 1, wherein said chest-shield element is of substantially triangular configuration, with its hypotenuse side facing upward and configured to blend into said head-guard element, the other two sides of said shield comprising belt locating, retaining and slidably operable controlling means for attachment to the existing shoulder belt means, and the area of the bottom angle comprising rotatable fastening means for slidably adjustable attachment of said device to said existing shoulder-belt means.

19. A device as claimed in claim 1, comprising means for easy attachment of auxiliary means to better position and stabilize the device over its user's chest, and to make its use possible in vehicles which do not have adequate anchorage means for efficient use of the device.

20. A device as claimed in claim 1, wherein the chest-shield element comprises on its outward face channel means configured to accept and guide the belt means diagonally crossing it from either direction, the channels having their bottom surface serrated and including sections of modified retaining flanges to help and retain said belt means inside of them at all times; a modified, rigid strap means with one of its ends rotatably secured to said chest-shield at its vertical center line, its other end easily connectable and disconnectable across the channel to said shield, thus spanning said belt within it, and slidably, operatively and adjustably connecting the device to said belt with the help of auxiliary resilient means secured to the inner side of the rigid strap means which prevent the device from unwanted sliding along said belt but allowing easy vertical adjustment of the device by simply pulling it in either direction.

21. A device as claimed in claim 20, wherein the serrations on the bottom surface of said channels are configured to lock the device to the belt when its user's torso exerts any forward pressure against it during any severe deceleration of said vehicle, thus preventing unwanted slidable movement of said device along said belt means, while permitting easy, abrasion-free sliding movement of the device along said belt means and normal vertical adjustment of it during normal riding conditions.

22. A device as claimed in claim 1, wherein all outward surfaces of said restraining device are configured as smooth as possible, comprising only such essential positioning, guiding and retaining means which are needed to locate, guide and retain said shoulder belt means spanning said device, to limit said belt's unwanted movement over its face and to prevent the device from sliding off said belt whenever user's torso is being restrained by said system while the vehicle is subjected to any severe deceleration and collision.

23. A device as claimed in claim 1, adapted to operatively attach to any other type of existing body restraining means configured of flexible belts, webbing, cables and other means normally employed for spanning the seat occupant's body and presently available in said vehicle.

24. A device as claimed in claim 1, wherein the upper portion of the head-guard element which normally extends above the shoulders and chest of the seat occupant is configured of such materials which will not cause any abrasions to the tender surface of user's face, neck and head when restraining him under any severe decelerations of the vehicle; said upper portion blending at its lower section into rigid base plate means which spans partially over its user's left and right shoulders to provide sufficient bracing for said upper portion and under the chin blending into the rigid chest-shield element of said device.

25. A device as claimed in claim 24, wherein said rigid chest-shield element portion of said device is just large enough to accommodate means for easily attaching, adjusting and detaching said device to and from the existing restraining means of the vehicle.

26. A device as claimed in claim 1, wherein the head-guard element is configured of tubular means being of sufficient diameter to provide adequate head brace during any whiplash of occupant's head and its ends comprising means for its closure, thus converting the hollow head-guard into a canister-type storage facility for personal use and convenience of its user.

27. A device as claimed in claim 8, wherein said chest-shield element is configured only as a panel large enough to accommodate the necessary means of attachment of it to the existing restraining means and to accept, position and support the head-guard element which is configured as a tubular chin-brace adjustably extendable from said chest-shield element.

28. A device as claimed in claim 1, wherein the head-guard element is configured to reach rearwardly over and above its user's shoulders and includes on the rearward portion thereof a combined positioning, guiding and slidably holding means for said shoulder belt means to prevent it from any harmful contact with the side of its user's neck and head when he is being restrained by it.

29. A device as claimed in claim 1, wherein the means operatively attaching and detaching the device to and from the existing restraining means are operatively, rotatably secured to the vertical center line of the chest-shield element and are configured to easily accept the shoulder belt for operatively slidable engagement with said belt and adjustable positioning of the device along said belt and easy detachment from it.

30. A device as claimed in claim 1, wherein the means of operatively attaching and detaching the device to and from the existing belt means comprise two types of controlling elements: one being a resilient, pressure sensitive means configured to allow easy slidable positioning of the device along said belt means when there is no forward pressure against said device and gently holding it in any selected position on said belt at all times, the other element configured to lock said device instantly and positively to said belt means whenever any forward pressure is exerted against the device, such locking action persisting until the forward pressure against said device is relaxed.

31. A device as claimed in claim 29, wherein said means of attachment comprise two basic elements: a rotatably mounted base plate means comprising channel means to accept said belt, the bottom of the channel provided with transverse serrations to operatively engage with said shoulder belt means; a hinged cover means operatively attached to the base plate on one longitudinal side of said belt and adapted for spanning it and easy securement of it on the other longitudinal side of said belt to said base plate, the cover comprising on its inner side a pressure yieldable means for engaging with said belt within said attaching means, thus allowing easy, slidable adjusting and positioning of said device along said belt means, while at all times keeping it gently in any selected position by preventing it from sliding along said belt means.

32. A device as claimed in claim 31, wherein said base plate means is configured with its bottom face, which is next to the face of said chest-shield, provided with annularly disposed serrations radiating from a spring-loaded attaching bolt means which keeps said base-plate in operative engagement with similarly disposed annular serrations incorporated into the outboard face of said chest-shield, thus permitting limited pivoting of said device around its attaching bolt means when there is no forward pressure against the device, but instantly locking said device in whatever angular inclination it may be at the moment when said device is subjected to any forward pressure and remaining so locked for the duration of such pressure against said device.

33. A device as claimed in claim 32, wherein the bottom portion of said base plate is circular in its outline and configured for operative engagement with circular field of annular serrations on the front face of said chest-shield means; the top side of said plate comprising elongated, serrated, partially enclosed channel means to accept said shoulder belt and including a modified hinged strap means to slidably hold said belt means within said channel means.

34. A device as claimed in claim 32, wherein said chest-shield has on its front face a large circular field of annular serrations for operative engagement with similarly configured bottom side of an elongated belt retaining means rotatably, operatively secured to the center of the serrated field, the belt retainer comprising serrated channel means and means to adjustably and slidably secure the shoulder belt within it.

35. A device as claimed in claim 32, wherein said chest-shield has at its front face a circular field of annular serrations; to its center is rotatably, operatively attached an oval shaped base plate with its conjugate axis same as the diameter of the circle, but its transverse axis as long as practical and including a serrated channel means along the transverse axis on top of the base plate and hinged type strap means to slidably secure the shoulder belt means within the serrated channel.

36. A device as claimed in claim 1, wherein the means of operatively attaching and detaching the device to and from the existing restraining means comprise a specially configured knurled transverse strap bar means operatively positionable over operatively compatible transverse depressions located crosswise through the serrated channel means configured in the face of the shield, and connectable to it by such as pin-and-keyhole aperture means, the assembly so configured that when the belt is placed into the channel and the strap bar is secured over the transverse depression and said belt, the device becomes slidably, adjustably attached to said belt means, but will lock instantly onto said belt under any forward pressure against said device.

37. A device as claimed in claim 36, comprising plurality of said transverse depressions disposed in such locations over the face of said chest-shield whereby the device will be operatively securable to said restraining belt means crossing its user's chest from either of his shoulders.

38. A device as claimed in claim 29, comprising connecting means of the modified hinge-strap type rotatably secured to the vertical center line of said shield on its hinged side end while its opposite end is quickly and easily securable to a plurality of fastening means located along the circumference of the circle described by said centrally secured hinge-strap means.

39. An assembly as claimed in claim 29, wherein said connecting means comprise an elongated sleeve means rotatably attached at one point to the device at its vertical center line, the sleeve configured to accept the shoulder-belt and opened along its length to permit insertion and removal of it therefrom; means for its closure; means to regulate the ease of slidable movement of said belt within said sleeve.

40. An assembly as defined in claim 39, wherein the upper end of said sleeve is interchangeably connectable to either outboard side of the device; its interior comprises belt gripping means; said means of its closure comprising modified separable fastener means; the means to prevent unwanted movement of the belt within said sleeve comprising suitable pads of resilient, compressible material secured inside said sleeve and controlled by the action of the separable fastener means.

41. A device as claimed in claim 1, wherein the top of said restraining device is adjustably securable to the lower end of the existing shoulder-belt means normally connectable to the existing lap-belt means; the bottom corners of said device modified to be connectable to the existing lap-belt means by suitably adapted auxiliary connecting means.

42. A device as claimed in claim 1, wherein the means of easily connecting and disconnecting the device to the existing shoulder-belt means are permanently attached to said shoulder-belt means in an operatively slidable, adjustable and lockable manner, whereby said device is quickly and easily connectable, operatively adjustable and disconnectable to said shoulder-belt means.

43. A device as claimed in claim 1, wherein the shoulder-belt diagonally crossing the front face of said device is configured to describe two shorter sides of an obtuse triangle, with the main operatively connecting means located at the point of the obtuse angle and the guiding and retaining means for said belt located at points of the acute angles of the triangle.

44. A device as claimed in claim 1, comprising additional auxiliary belt means with necessary connecting and anchoring means to enable said device to be used in vehicle seats which are not equipped with any type of a lap-belt and shoulder-belt body restraining means; when only the lap-belt means are provided and in those instances where the existing restraining means are for any reason inadequate to provide the necessary support for said device.

45. A device as claimed in claim 1, configured to be functionally adaptable and operably connectable to any type of a restraining system crossing the seat occupant's torso in any direction; comprising means which adapt it to be usable with body restraining devices of other than the lap-belt shoulder-belt type of restraining systems; comprising means adapting it to be functionally operative with other than the belt-type of restraining members of any body restraining system.

* * * * *

UNITED STATES PATENT OFFICE
CERTIFICATE OF CORRECTION

Patent No. 3,968,994    Dated July 13, 1976

Inventor(s)  John J. Chika

It is certified that error appears in the above-identified patent and that said Letters Patent are hereby corrected as shown below:

Column: below Abstract, delete "43" and insert -- 42 --.

Column 4, line 31, "impace" should read -- impact --.

Column 6, line 11, after "sleve" should read -- Fm --.

Column 3, line 31, "houlder" should read -- shoulder --.

Column 6, line 31, "chest-shiled" should read -- chest-shield --.
Column 6, line 46, "tose" should read -- those --.
         line 47, "te" should read -- the --.

Column 7, line 31, "2" should read -- 23 --.

Column 7, line 62, "made of" after "55" should be deleted.
Column 8, line 49, "stray" should read -- strap --.
Column 10, line 6, after "not" -- as -- should be inserted.

Signed and Sealed this

Sixth Day of June 1978

[SEAL]

Attest:

RUTH C. MASON
*Attesting Officer*

DONALD W. BANNER
*Commissioner of Patents and Trademarks*